United States Patent
Surineni et al.

(10) Patent No.: US 8,542,589 B2
(45) Date of Patent: Sep. 24, 2013

(54) METHOD AND APPARATUS FOR PROVIDING BEAMFORMING FEEDBACK IN WIRELESS COMMUNICATION SYSTEMS

(75) Inventors: Shravan K. Surineni, Waltham, MA (US); J. Rodney Walton, Carlisle, MA (US); Mark S. Wallace, Bedford, MA (US); Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1887 days.

(21) Appl. No.: 11/753,798

(22) Filed: May 25, 2007

(65) Prior Publication Data
US 2008/0045153 A1 Feb. 21, 2008

Related U.S. Application Data

(60) Provisional application No. 60/811,245, filed on Jun. 5, 2006.

(51) Int. Cl.
*G08C 15/00* (2006.01)

(52) U.S. Cl.
USPC ........... 370/231; 370/328; 370/350; 370/436; 370/470; 370/474; 455/13.3; 455/24

(58) Field of Classification Search
USPC ................. 370/231, 328, 334, 350, 436, 503, 370/509, 510, 511, 512, 513, 514; 455/13.3, 455/24
See application file for complete search history.

(56) References Cited

U.S. PATENT DOCUMENTS

| 6,470,192 | B1 | 10/2002 | Karlsson et al. |
| 6,839,574 | B2 | 1/2005 | Petrus et al. |
| 7,376,094 | B2 | 5/2008 | Chun et al. |
| 7,542,515 | B2 * | 6/2009 | Li et al. ................. 375/260 |
| 7,715,442 | B2 * | 5/2010 | Trainin et al. ............. 370/503 |

(Continued)

FOREIGN PATENT DOCUMENTS

| JP | 2005318332 A | 11/2005 |
| JP | 2006129393 A | 5/2006 |
| RU | 2237379 C2 | 9/2004 |
| WO | WO2004057775 A1 | 7/2004 |
| WO | 2005039105 | 4/2005 |

OTHER PUBLICATIONS

Taiwan Search Report—TW096120136—TIPO—Nov. 23, 2010.

(Continued)

*Primary Examiner* — Alvin Zhu
(74) *Attorney, Agent, or Firm* — QUALCOMM IP Department; James Hunt Yancey, Jr.

(57) ABSTRACT

Techniques for quickly sending feedback information for beamforming are described. A transmitter/initiator sends a first frame comprising training symbols. A receiver/responder receives the first frame, determines the amount of time to generate feedback information, and determines the amount of time to send the feedback information. The receiver then determines the length of a second frame carrying the feedback information based on the amounts of time to generate and send the feedback information. The receiver sends the second frame after waiting a short interframe space (SIFS) period from the end of the first frame, without performing channel access. The receiver generates the feedback information based on the training symbols and sends the information in the second frame when ready. The transmitter receives the second frame, derives at least one steering matrix based on the feedback information, and sends a third frame with the at least one steering matrix.

41 Claims, 6 Drawing Sheets

(56) References Cited

U.S. PATENT DOCUMENTS

| | | | |
|---|---|---|---|
| 7,894,820 B2 * | 2/2011 | Li et al. | 455/450 |
| 2005/0018636 A1 | 1/2005 | Paneth et al. | |
| 2006/0092871 A1 | 5/2006 | Nishibayashi et al. | |
| 2006/0165191 A1 * | 7/2006 | Lin et al. | 375/267 |
| 2007/0211625 A1 * | 9/2007 | Liu et al. | 370/229 |
| 2008/0002615 A1 * | 1/2008 | Nakajima et al. | 370/328 |

OTHER PUBLICATIONS

Translation of Office Action in Russian application 2008152804 corresponding to U.S. Appl. No. 11/753,798, citing RU2237379C2, Adrian Stephens pp. 1-101, XP002460430 year 2006, US20060092871 and WO2004057775 dated Apr. 27, 2011.

Adrian Stephens, Sean Coffey: "IEEE P802.11 Wireless LANs; Joint Proposal: High throughput extension to the 802.11; Standard: MAC" IEEE 802.11-05/1095R5, Jan. 2006, pp. 1-101, XP002460430.

International Search Report—PCT/US07/069967, International Search Authority—European Patent Office—Dec. 21, 2007.

Stephens, et al., "IEEE P802.11 Wireless LANs; Joint Proposal: High throughput extension to the 802.11; Standard: MAC" IEEE 802.11-05/1095R4, Jan. 2006, pp. 1-103.

Written Opinion—PCT/US07/069967, International Searching Authority—European Patent Office, Dec. 21, 2007.

* cited by examiner

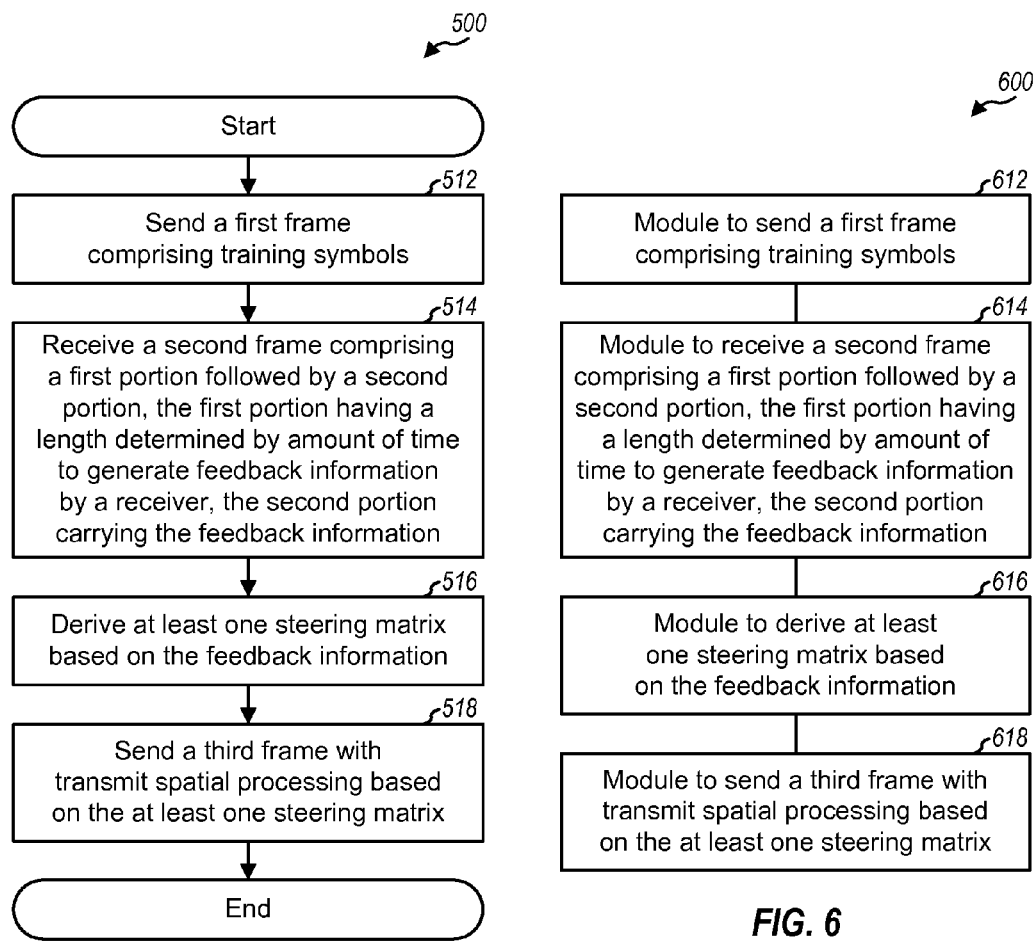

METHOD AND APPARATUS FOR PROVIDING BEAMFORMING FEEDBACK IN WIRELESS COMMUNICATION SYSTEMS

The present application claims priority to provisional U.S. Application Ser. No. 60/811,245, entitled "METHOD AND SYSTEM FOR PROVIDING BEAMFORMING FEEDBACK IN WIRELESS COMMUNICATION SYSTEMS," filed Jun. 5, 2006, assigned to the assignee hereof and incorporated herein by reference.

BACKGROUND

I. Field

The present disclosure relates generally to communication, and more specifically to techniques for sending feedback information for beamforming in a wireless communication system.

II. Background

In a wireless communication system, a transmitter may utilize multiple (T) transmit antennas for data transmission to a receiver equipped with multiple (R) receive antennas. The multiple transmit and receive antennas form a multiple-input multiple-output (MIMO) channel that may be used to increase throughput and/or improve reliability. For example, the transmitter may send up to T data streams simultaneously from the T transmit antennas to improve throughput. Alternatively, the transmitter may send a single data stream from all T transmit antennas to improve reception by the receiver.

Good performance (e.g., high throughput) may be achieved by transmitting one or more data streams with beamforming. To perform beamforming, the transmitter may send a sounding frame containing known training symbols to the receiver. The terms "frame" and "packet" are synonymous and are used interchangeably herein. The receiver may receive the sounding frame and estimate the response of the MIMO channel based on the training symbols. The receiver may then send feedback information to the transmitter. The feedback information may include channel matrices or beamforming matrices, which may be used by the transmitter to derive steering matrices for beamforming. It is desirable to send the feedback information as quickly as possible. This is because the MIMO channel may be changing, and excessive delay in sending the feedback information may result in the information being stale by the time it is used for data transmission to the receiver.

There is therefore a need in the art for techniques to send feedback information for beamforming with as little delay as possible.

SUMMARY

Techniques for quickly sending feedback information for beamforming are described herein. A transmitter/initiator may send a first frame comprising training symbols. A receiver/responder may receive the first frame, determine the amount of time to generate feedback information based on the training symbols, and determine the amount of time to send the feedback information. The receiver may then determine the length of a second frame carrying the feedback information based on the amount of time to generate the feedback information and the amount of time to send the feedback information. The second frame may be an aggregate frame comprising a first portion followed by a second portion. The first portion may have a length equal to or exceeding the amount of time to generate the feedback information. The second portion may carry the feedback information.

The receiver may send the second frame after waiting a short interframe space (SIFS) period from the end of the first frame, without performing channel access, which may reduce delay in sending the feedback information. The receiver may generate the feedback information based on the training symbols and send the feedback information in the second frame when the information ready. The feedback information may comprise at least one channel matrix, at least one beamforming matrix, etc. The transmitter may receive the second frame, derive at least one steering matrix based on the feedback information, and send a third frame with transmit spatial processing based on the at least one steering matrix.

Various aspects and features of the disclosure are described in further detail below.

BRIEF DESCRIPTION OF THE DRAWINGS

FIG. 5 shows a process performed by a transmitter/initiator.

FIG. 6 shows an apparatus for a transmitter/initiator.

DETAILED DESCRIPTION

The techniques described herein may be used for various wireless communication networks and systems such as wireless local area networks (WLANs), wireless metropolitan area networks (WMANs), wireless wide area networks (WWANs), etc. The terms "networks" and "systems" are often used interchangeably. A WLAN may implement any of the radio technologies in the IEEE 802.11 family of standards, Hiperlan, etc. A WMAN may implement IEEE 802.16, etc. A WWAN may be a cellular network such as a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. For clarity, certain aspects of the techniques are described below for a WLAN that implements IEEE 802.11n.

IEEE 802.11n utilizes orthogonal frequency division multiplexing (OFDM), which is a modulation technique that partitions the system bandwidth into multiple (K) orthogonal subcarriers. In IEEE 802.11n, K=64 total subcarriers are defined with OFDM and are assigned indices of −32 to +31. The 64 total subcarriers include 52 data subcarriers with indices of $\{1, \ldots, 6, 8, \ldots, 20, 22, \ldots, 28\}$ and four pilot subcarriers with indices of $\pm\{7, 21\}$. The DC subcarrier with index of 0 and the remaining subcarriers are not used. IEEE 802.11n also supports MIMO transmission from multiple transmit antennas to multiple receive antennas. IEEE 802.11n is described in a document entitled "IEEE P802.11n™/D2.00, Part 11: Wireless LAN Medium Access Control (MAC) and Physical Layer (PHY) specifications: Amendment: Enhancements for Higher Throughput," February 2007, which is publicly available.

Figure 1:
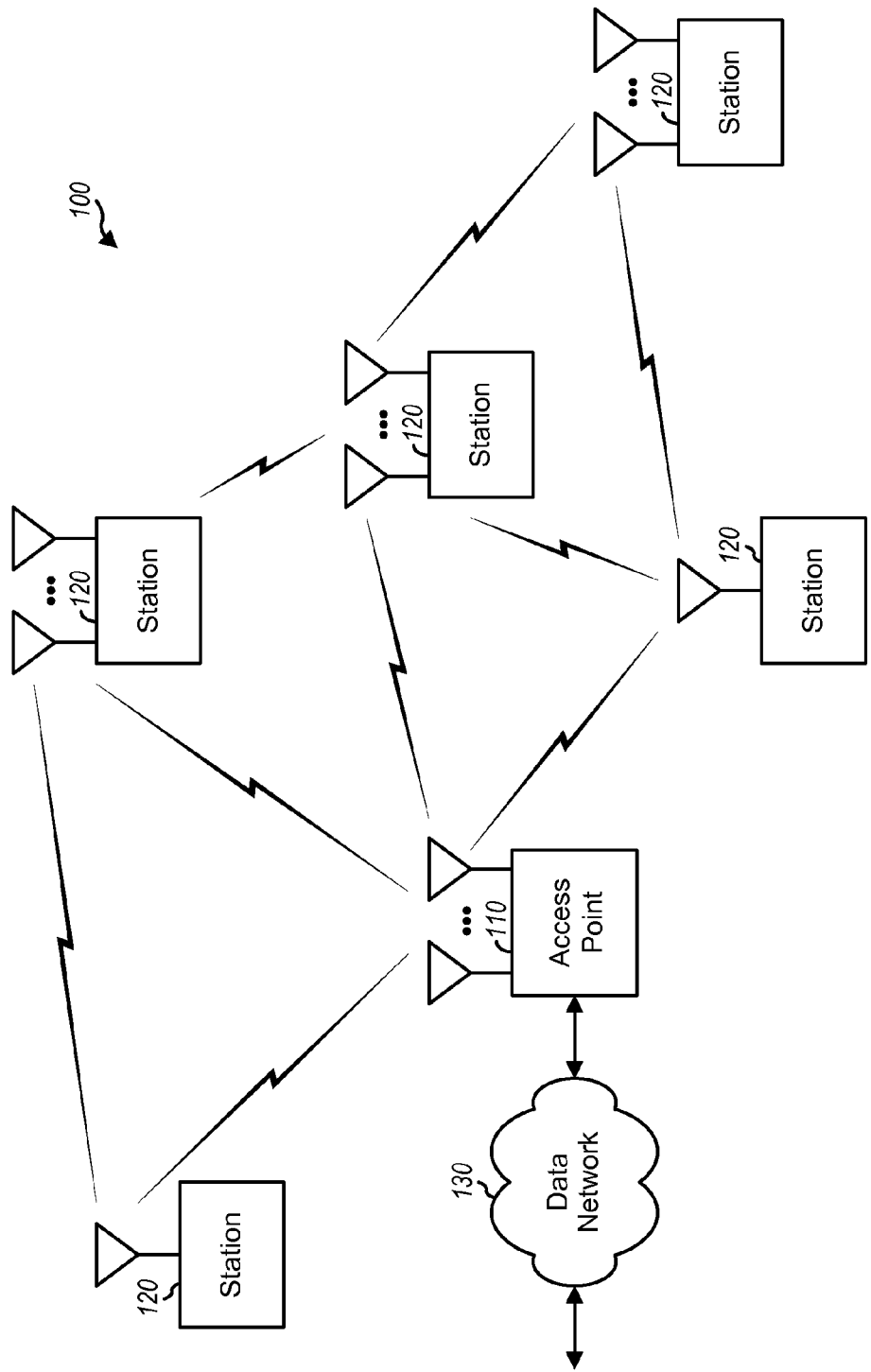
FIG. 1 shows a wireless network with an access point and multiple stations.

FIG. 1 shows a wireless network 100 with an access point 110 and multiple stations 120. In general, a wireless network may include any number of access points and any number of stations. A station is a device that can communicate with another station via a wireless medium/channel. A station may also be called, and may contain some or all of the functionality of, a terminal, a mobile station, a user equipment, a subscriber station, etc. A station may be a cellular phone, a handheld device, a wireless device, a personal digital assistant (PDA), a laptop computer, a wireless modem, a cordless phone, etc. An access point is a station that provides access to distribution services via the wireless medium for stations associated with that access point. An access point may also be called, and may contain some or all of the functionality of, a base station, a base transceiver station (BTS), a Node B, etc. Stations 120 may communicate with access point 110 and/or with one another via peer-to-peer communication. Access point 110 may couple to a data network 130 and may communicate with other devices via the data network. Data network 130 may be the Internet, an intranet, or any other wired or unwired network.

The techniques described herein may be used for MIMO transmission on the downlink as well as the uplink. For the downlink, access point 110 may be a transmitter, and stations 120 may be receivers. For the uplink, stations 120 may be transmitters, and access point 110 may be a receiver.

A MIMO channel formed by multiple (T) transmit antennas at a transmitter and multiple (R) receive antennas at a receiver may be characterized by an R×T channel matrix $H_k$ for each subcarrier k or each group of subcarriers of interest. Channel matrix $H_k$ may be diagonalized by performing eigenvalue decomposition of a correlation matrix of $H_k$, as follows:

$$R_k = H_k^H H_k = V_k \Lambda_k V_k^H, \quad \text{Eq (1)}$$

where $R_k$ is a T×T correlation matrix of $H_k$, $V_k$ is a T×T unitary matrix whose columns are eigenvectors of $R_k$, $\Lambda_k$ is a T×T diagonal matrix of eigenvalues of $R_k$, and "$H$" denotes a conjugate transpose.

Unitary matrix $V_k$ is characterized by the property $V_k^H V_k = I$, where I is the identity matrix. The columns of a unitary matrix are orthogonal to one another, and each column has unit power. $V_k$ is also referred to as a beamforming matrix. Diagonal matrix $\Lambda_k$ contains possible non-zero values along the diagonal and zeros elsewhere. The diagonal elements of $\Lambda_k$ are eigenvalues representing the power gains of the eigenmodes of $R_k$.

The transmitter may perform transmit spatial processing for beamforming to the receiver, as follows:

$$z_k = Q_k x_k, \quad \text{Eq (2)}$$

where $x_k$ is a vector with up to T data symbols to be sent on subcarrier k, $Q_k$ is a steering matrix for subcarrier k, which may be derived based on $V_k$, and $z_k$ is a vector with T output symbols for the T transmit antennas on subcarrier k.

The beamforming in equation (2) steers or shapes the beams sent from the transmitter to the receiver. For effective beamforming, the transmitter should have an accurate estimate of the response of the MIMO channel from the transmitter to the receiver. This information on the MIMO channel may be used to derive appropriate steering matrices for transmit spatial processing to direct the beams from the transmitter toward the receiver.

For explicit beamforming, the transmitter may send a sounding frame to the receiver. A sounding frame is a frame carrying known training symbols, which allow the receiver to estimate a channel matrix for each subcarrier or each group of subcarriers of interest. A sounding frame may or may not contain other data besides the training symbols. The transmitter may send either (i) an unsteered sounding frame without using any steering matrix or (ii) a steered sounding frame using a steering matrix $Q'_k$ obtained from an earlier frame exchange with the receiver. The receiver may estimate either (i) an actual channel matrix $H_k$ based on an unsteered sounding frame or (ii) an effective channel matrix $H_{eff,k} = H_k Q'_k$ based on a steered sounding frame.

The receiver may send channel matrices $H_k$ or $H_{eff,k}$ as feedback information to the transmitter. $H_k$ and $H_{eff,k}$ may also be referred to as channel state information (CSI) matrices. The transmitter may derive $V_k$ based on $H_k$ or $H_{eff,k}$ obtained from the receiver. The transmitter may then derive steering matrix $Q_k$ based on $V_k$, e.g., $Q_k = V_k$ if an unsteered sounding frame was sent to the receiver, or $Q_k = Q'_k V_k$ if a steered sounding frame was sent. The transmitter may then use $Q_k$ to send data to the receiver, e.g., as shown in equation (2).

Alternatively, the receiver may compute $V_k$ based on $H_k$ or $H_{eff,k}$ obtained from the sounding frame. The receiver may then send $V_k$ as feedback information to the transmitter. The transmitter may derive $Q_k$ based on $V_k$ and may then use $Q_k$ to send data to the receiver.

Figure 2:
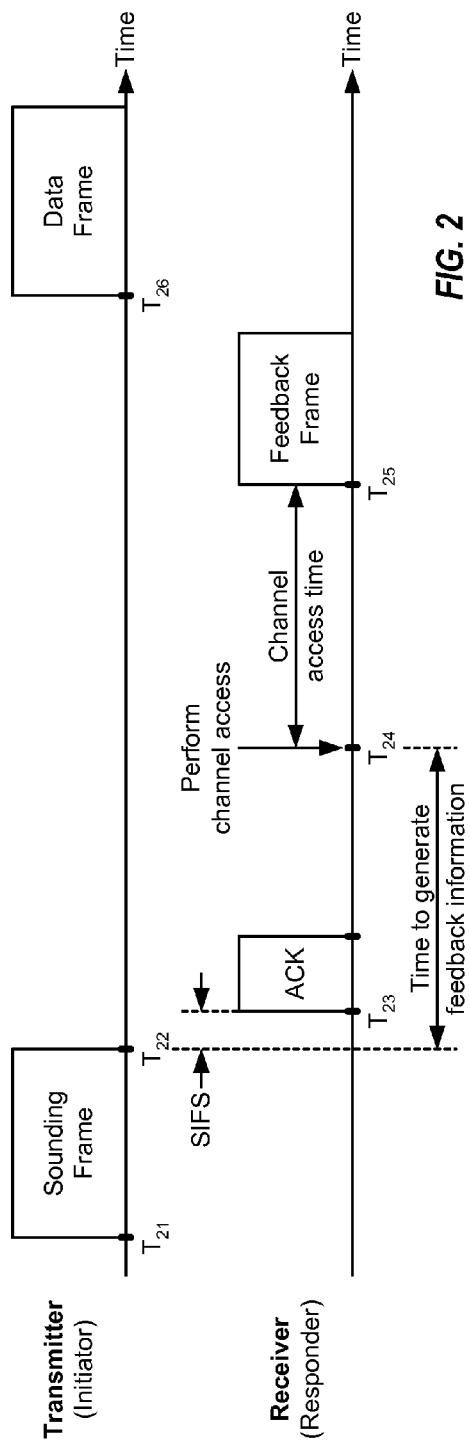
FIG. 2 shows a frame exchange to send feedback information for beamforming.

FIG. 2 shows a frame exchange to send feedback information for beamforming. At time $T_{21}$, the transmitter may send a sounding frame to the receiver. In IEEE 802.11n, the transmitter is also referred to as an initiator, and the receiver is also referred to as a responder. The sounding frame carries known training symbols and may or may not carry other data.

The receiver may monitor the wireless channel for frames sent to the receiver. The receiver may recognize that the sounding frame is sent to it based on a destination address in the frame if MAC data is present in the frame. If a sounding frame format that does not have any MAC data (such as Null Data Packet in IEEE 802.1 In) is used, then a prior indication is sent to the intended recipient of the arrival of a sounding frame. After detecting the end of the sounding frame at time $T_{22}$, the receiver may wait SIFS period, which is 16 microseconds (μs) in IEEE 802.11n, and then send an acknowledgement (ACK) for the sounding frame at time $T_{23}$. The wireless channel may be shared by many stations. The SIFS period is sufficiently short so that the receiver can gain control of the wireless channel immediately after the sounding frame, without having to contend for the wireless channel with other stations that may desire to access the channel.

The receiver may estimate a channel matrix $H_k$ or $H_{eff,k}$ for each subcarrier or each group of subcarriers of interest based on the training symbols in the sounding frame. The receiver may also derive $V_k$ for each subcarrier or each group of subcarriers based on $H_k$ or $H_{eff,k}$. The receiver may then generate feedback information based on $H_k$, $H_{eff,k}$, or $V_k$.

After generating the feedback information at time $T_{24}$, the receiver may perform channel access in order to gain access to the wireless channel. The channel access may take few milliseconds (ms) or more, depending on the amount of activity on the channel. After gaining access to the channel at time $T_{25}$, the receiver may send a frame containing the feedback information. The transmitter may receive the feedback frame from the receiver and, at time $T_{26}$, may send a data frame with steering matrices derived based on the feedback information.

As shown in FIG. 2, the receiver may return an ACK immediately to the transmitter for the sounding frame but may send the feedback information in an unsolicited frame at a later time. The receiver may not know a priori when sounding frames will be received, and no resources may have been allocated to process a sounding frame. Furthermore, regardless of whether or not the receiver has prior knowledge of an incoming sounding frame, some amount of time is typically needed to process the sounding frame. For example, the eigenvalue decomposition in equation (2) may be computationally intensive, and there may be many subcarriers for which to estimate the channel matrix and derive the beamforming matrix.

Sending an unsolicited frame at a later time may provide the receiver with sufficient time to process the sounding frame and generate the feedback information. However, the receiver would need to perform channel access in order to send the unsolicited frame containing the feedback information. This channel access may incur additional (and variable) delay. Since the wireless channel may be changing, the feedback information may be stale or become less accurate due to the channel access delay.

In general, it is desirable to send the feedback information as quickly as possible. If the receiver can generate the feedback information in very short time, e.g., on the order of SIFS period, then the receiver may send the feedback information along with the ACK in an immediate frame starting at time $T_{23}$. An immediate frame is a frame sent after waiting SIFS period from the end of a prior received frame. However, the receiver may not have the capability to generate the feedback information within SIFS period and may not be able to send the feedback information in an immediate frame. Requiring the feedback information to be generated within SIFS period and sent in an immediate frame may impose stringent hardware/silicon requirements on the receiver, which may be undesirable.

Figure 3:
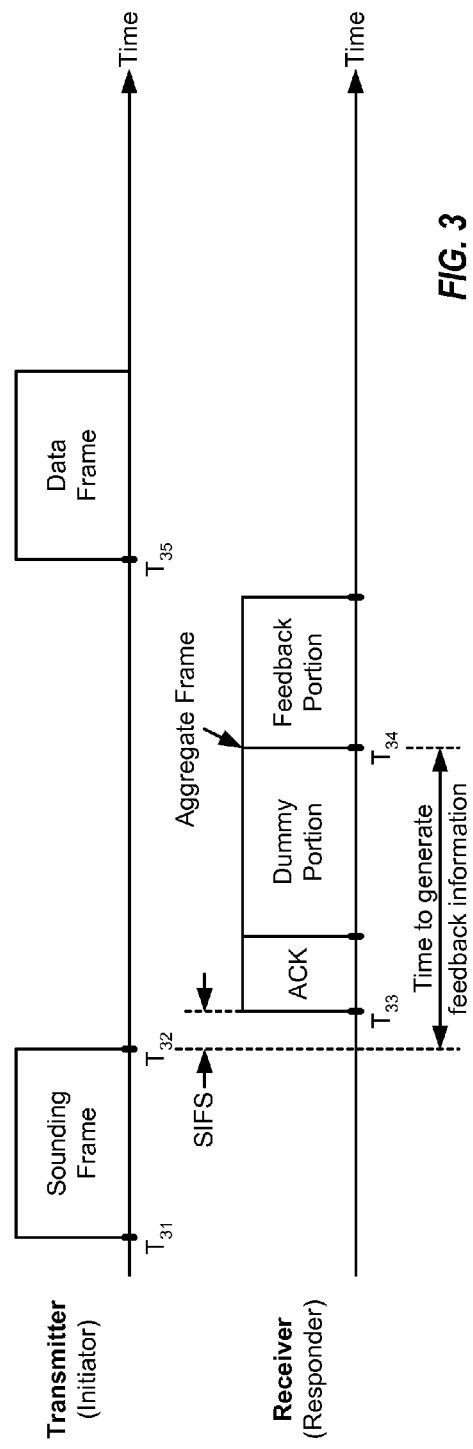
FIG. 3 shows a frame exchange using an aggregate frame to send feedback information for beamforming with as little delay as possible.

FIG. 3 shows a frame exchange using an aggregate frame to send feedback information for beamforming with as little delay as possible. The transmitter may send a sounding frame to the receiver from times $T_{31}$ to $T_{32}$. The receiver may receive the sounding frame, determine the amount of time needed to generate the feedback information, and determine the amount of time needed to send the feedback information. The receiver may then generate an aggregate frame containing an ACK for the sounding frame, a first/dummy portion for the amount of time needed to generate the feedback information, and a second/feedback portion for the feedback information. The first portion may carry any data to be sent by the receiver to the transmitter and may be generated by obeying the rules of aggregating frames within an A-MPDU or an aggregate frame. Alternatively, the first portion may include null data, etc. The receiver may then wait SIFS period and then send the aggregate frame starting at time $T_{33}$. The receiver may process the sounding frame and generate feedback information while sending the aggregate frame. The feedback information may be ready by the end of the first portion at time $T_{34}$ and may be sent without additional delay in the second portion of the aggregate frame.

The transmitter may receive the aggregate frame from the receiver. At time $T_{35}$, the transmitter may send a data frame with steering matrices derived based on the feedback information.

As shown in FIG. 3, the receiver may return an ACK immediately to the transmitter for the sounding frame and may send feedback information in the same immediate aggregate frame in order to avoid additional delay associated with performing channel access. The receiver may generate the feedback information in accordance with its capabilities and may select a suitable duration for the first portion to have sufficient time to generate the feedback information. The receiver may send the feedback information in the second portion of the aggregate frame as soon as the information is ready, without having to perform channel access.

An aggregate frame carrying feedback information may be formed in different manners for different systems. For clarity, an aggregate frame in IEEE 802.11n is described below.

In IEEE 802.11n, a Medium Access Control (MAC) protocol processes data as MAC protocol data units (MPDUs). A Physical Layer Convergence Protocol (PLCP) then processes the MPDUs to generate PLCP protocol data units (PPDUs). A physical layer (PHY) then processes each PPDU to generate a frame, which is transmitted via the wireless channel. In IEEE 802.11n, a high-throughput PPDU (HT-PPDU) may be used for MIMO transmission from multiple transmit antennas to multiple receive antennas.

Figure 4A:
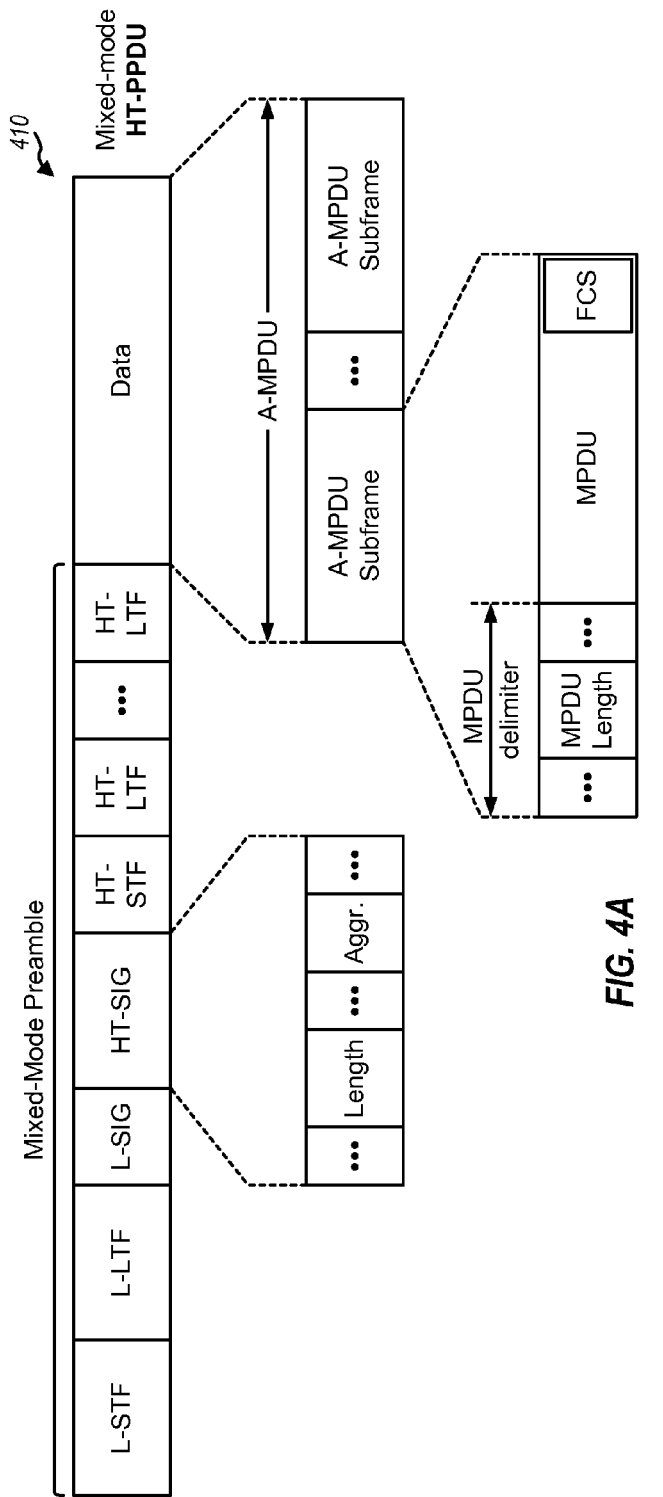
FIGS. 4A and 4B show two frame structures in IEEE 802.11n.

FIG. 4A shows a structure of an HT-PPDU 410 with an HT mixed format in IEEE 802.11n. HT-PPDU 410 includes a mixed-mode preamble followed by a Data field. The mixed-mode preamble includes (i) a legacy preamble composed of a legacy short training field (L-STF) and a legacy long training field (L-LTF), (ii) a legacy signal (L-SIG) field, (iii) an HT signal (HT-SIG) field, and (iv) an HT preamble composed of an HT short training field (HT-STF) and one or more HT long training fields (HT-LTFs). The number of HT-LTFs is equal to or greater than the number of streams being sent simultaneously. The long and short training fields carry known training symbols that may be used for frame detection, time acquisition, frequency estimation and correction, automatic gain control (AGC), channel estimation, etc. The L-SIG and HT-SIG fields carry signaling information for the HT-PPDU. For example, the HT-SIG field carries (i) a Length field that indicates the length of the Data field and (ii) an Aggregation (Aggr.) field that indicates whether or not the Data field carries an aggregate MPDU (A-MPDU). The Data field carries the payload of the HT-PPDU and has a variable length indicated by the Length field. HT-PPDU 410 may be used for a sounding frame or an aggregate frame. The L-STF, L-LTF and L-SIG fields have a combined duration of 20 μs, and the duration of the dummy portion may be reduced by the duration of these legacy fields when HT-PPDU 410 is used for the aggregate frame.

Figure 4B:
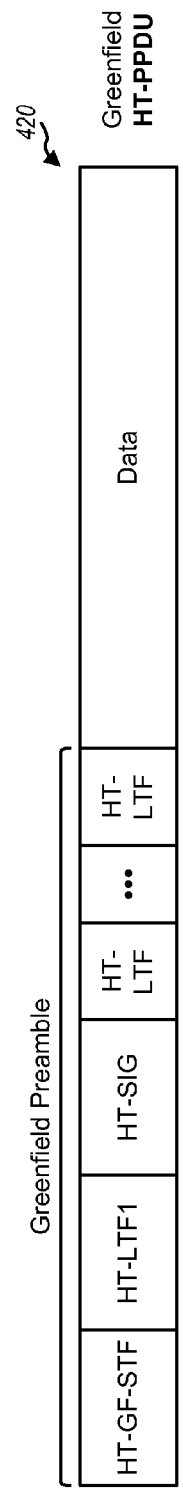

FIG. 4B shows a structure of an HT-PPDU 420 with an HT greenfield format in IEEE 802.11n. HT-PPDU 420 includes a greenfield preamble followed by a Data field. The greenfield preamble includes an HT greenfield short training field (HT-GF-STF), an HT long training field (HT-LTF1), an HT-SIG field, and one or more HT-LTFs. The HT-SIG field carries a Length field and an Aggregation field, as shown in FIG. 4A. The Data field carries the payload of the HT-PPDU and has a variable length indicated by the Length field. HT-PPDU 420 may also be used for a sounding frame or an aggregate frame.

HT-PPDUs 410 and 420 are two PPDU frame formats supported by IEEE 802.11n. HT-PPDU 410 may be used for a WLAN deployment with both legacy stations that do not support HT transmissions as well as HT stations that support HT transmissions. The legacy stations may recognize the legacy preamble and the L-SIG field, which may inform these stations to ignore the HT-PPDU. HT-PPDU 420 may be used for frames exchanged between HT stations. The formats of HT-PPDU 410, HT-PPDU 420, and other PPDUs supported by IEEE 802.11n are described in the aforementioned IEEE 802.11n document.

The transmitter may send a sounding frame using HT-PPDU 410 or 420. The sounding frame includes the HT preamble may or may not include any of the remaining fields in HT-PPDU 410 or 420. The sounding frame may include the Data field, which may carry one or more MPDUs with data intended for the receiver. The sounding frame may also be a Null Data Packet (NDP) or a Zero Length Frame (ZLF) having no Data field.

The receiver may send an aggregate frame using HT-PPDU 410 or 420. The aggregate frame may include the mixed-mode preamble in FIG. 4A or the greenfield preamble in FIG. 4B as well as the Data field. The Data field may carry an A-MPDU of a suitable length. The receiver may select HT-PPDU 410 or 420 for the aggregate frame based on various factors. For example, the receiver may select HT-PPDU 410 when operating in a mixed-mode environment. The length of the mixed-mode preamble is longer than the length of the greenfield preamble, by approximately 8 µs in IEEE 802.11n. The receiver may thus select HT-PPDU 410 or 420 based on the amount of time needed to generate the feedback information. For example, the receiver may select HT-PPDU 410 when the feedback generation time exceeds a threshold, which may be the length of the A-MPDU plus a margin, e.g., 7 µs, and may select HT-PPDU 420 otherwise. The receiver may also send mixed-mode HT-PPDU 410 when the transmitter has sent a greenfield HT-PPDU 420 with an MPDU. The receiver may also send mixed-mode HT-PPDU 410 when the transmitter has sent a greenfield HT-PPDU 420 for a NDP/ZLF.

Regardless of the PPDU format selected for the sounding frame, the PPDU carries an A-MPDU of a suitable length. As shown in FIG. 4A, the A-MPDU contains multiple A-MPDU subframes, with each subframe having a variable length. Each A-MPDU subframe includes an MPDU delimiter and an MPDU. The MPDU delimiter includes an MPDU Length field that indicates the length of the associated MPDU. Each MPDU may contain data that is encoded separately by MAC and may include a frame check sequence (FCS) used for error detection of the MPDU. An FCS is also commonly referred to as a cyclic redundancy check (CRC).

In general, the receiver may generate an aggregate frame with an A-MPDU containing any number of MPDUs. One or more MPDUs may cover the time duration needed by the receiver to generate the feedback information and may be referred to as dummy MPDUs. Each dummy MPDU may be any valid MAC protocol data unit (PDU), e.g., a MAC management PDU, an ICMP echo message, etc. The type of data being sent in each dummy MPDU may be indicated by appropriate control bits in the MPDU, e.g., by frame type and subtype values in a frame control/header portion of the MPDU. One or more MPDUs may carry the feedback information for beamforming and may be referred to as feedback MPDUs. For example, all feedback information may be sent in a single MPDU. Alternatively, multiple MPDUs may carry the feedback information, e.g., with each MPDU carrying feedback information for a different set of subcarriers. For clarity, the following description assumes that one dummy MPDU and one feedback MPDU are sent in the A-MPDU.

The receiver may generate and send different types of feedback to the transmitter for beamforming. In IEEE 802.11n, the receiver may send any one of the following feedback:

CSI matrices feedback—send CSI matrices containing $H_k$ or $H_{\mathit{eff},k}$.

Non-compressed beamforming matrix feedback—send elements of $V_k$, and

Compressed beamforming matrix feedback—decompose $V_k$ into a set of matrices and send angles for these matrices.

The receiver may know a priori how much time is needed to generate each type of feedback. The receiver may also know a priori how much data to send for each type of feedback. This information may be stored in a look-up table.

Upon receiving a sounding frame, the receiver may select the type of feedback to send to the transmitter. The receiver may also determine the amount of time to generate feedback information of this type from the look-up table. The receiver may ascertain the data rate to use for an aggregate frame. This data rate may be determined based on the configuration of the receiver (e.g., the number of antennas), the channel conditions, etc. The receiver may estimate the received signal quality based on the training symbols in the sounding frame and may select an appropriate data rate based on the received signal quality. From the data rate, the receiver can determine how many bytes of data can be sent in each unit of time, e.g., each OFDM symbol period of 4 µs in IEEE 802.11n.

The receiver may determine the length (Len_D) of the dummy portion of the A-MPDU based on the amount of time needed to generate the feedback information and the data rate. The receiver may also determine the length (Len_FB) of the feedback portion of the A-MPDU based on the amount of data to send for the feedback information and the data rate. The receiver may generate an HT-PPDU with (i) the Length field in the HT-SIG field set equal to the length of the dummy portion plus the length of the feedback portion in the A-MPDU and (ii) the Aggregation field set to '1' to indicate an A-MPDU being sent in the Data field of the HT-PPDU. The receiver may generate a dummy MPDU with a length of Len_D and may set the MPDU Length field of the associated A-MPDU subframe to Len_D. The receiver may also generate a feedback MPDU with a length of Len_FB and may set the MPDU Length field of the associated A-MPDU subframe to Len_FB.

The receiver may send the HT-PPDU after waiting SIFS period from the end of the sounding frame. The receiver may send the preamble of the HT-PPDU as well as the dummy MPDU while it is generating the feedback information. The receiver may encode the feedback information and send the encoded data in the feedback MPDU, which may be appended at the end of the dummy MPDU.

The use of an aggregate frame with an additional/dummy MPDU of a duration covering the time needed to generate the feedback information may provide certain advantages. First, hardware/silicon requirements of the receiver may be reduced/relaxed since the receiver can have more time to generate the feedback information. The additional MPDU may be especially beneficial when the transmitter sends a sounding frame as a NDP/ZLF with no MAC payload. In this case, the amount of time from the end of the sounding frame to the start of an immediate aggregate frame is even less than for a sounding frame with a MAC payload. The use of the additional MPDU in the immediate A-MPDU may relax the response time requirements of the receiver.

The transmitter may receive the aggregate frame from the receiver and process this frame to recover the feedback information sent by the receiver. The transmitter may recognize that an A-MPDU is sent in the aggregate frame based on the Aggregation field in the HT_SIG field. The transmitter may check each received MPDU based on the FCS for that MPDU. If the feedback MPDU passes the FCS check, then the transmitter may derive steering matrices based on the feedback information obtained from this MPDU. For CSI matrices feedback, the transmitter may obtain $H_k$ or $H_{\mathit{eff},k}$ from the feedback MPDU, derive $V_k$ based on $H_k$ or $H_{\mathit{eff},k}$, and update $Q_k$ based on $V_k$. For non-compressed or compressed beamforming matrix feedback, the transmitter may obtain $V_k$ from the feedback MPDU and update $Q_k$ based on $V_k$.

At the transmitter, MAC may perform FCS checking, and PHY may derive the steering matrices. PHY may initially receive the feedback MPDU and pass this MPDU up to MAC for FCS checking. After passing the FCS check, MAC may send the feedback MPDU back down to PHY for steering matrix computation. To reduce the amount of time to process the feedback MPDU by both PHY and MAC, the feedback information may be stored in a memory that is accessible to both PHY and MAC. Using a shared memory may avoid the need to pass data between PHY and MAC. PHY may also perform steering matrix computation concurrently with the FCS checking by MAC, so that some or much of the steering matrix computation may be completed by the time the FCS check is done.

PHY may also perform steering matrix computation and aggregate frame reception in a pipelined manner. The feedback MPDU may carry feedback information for subcarrier 1, then subcarrier 2, etc., and then subcarrier N. PHY may perform steering matrix computation for each subcarrier after receiving the feedback information for that subcarrier, while feedback information for remaining subcarriers are being received. Pipelining the steering matrix computation with the frame reception may reduce processing delays so that a next immediate frame may be sent with the steering matrices derived from the feedback information as soon as possible.

The transmitter may also derive steering vectors for one mode at a time. Each steering matrix may include S columns for S beams (or modes) that may be sent in parallel from T transmit antennas, where 1≤S≤T. The transmitter may derive steering vectors for one mode for all subcarriers of interest and may use these steering vectors for data transmission while computing steering vectors for another mode. The transmitter may use steering vectors for each mode for data transmission as they are computed. If the transmitter and receiver have an ongoing frame exchange, then this processing may allow the transmitter and receiver to effectively use explicit beamforming in immediate response frame exchange.

FIG. 5 shows a design of a process 500 performed by a transmitter/initiator. A first frame (e.g., a sounding frame) comprising training symbols may be sent to a receiver (block 512). A second frame (e.g., an aggregate frame) comprising a first portion followed by a second portion may be received, e.g., after SIFS period from the end of the first frame (block 514). The first portion may comprise at least one MPDU having a length determined by the amount of time to generate feedback information by the receiver. The second portion may comprise at least one MPDU carrying the feedback information.

At least one steering matrix may be derived based on the feedback information obtained from the second frame (block 516). For block 516, at least one channel matrix may be obtained from the feedback information. At least one beamforming matrix may be derived based on the at least one channel matrix and used to derive the at least one steering matrix. Alternatively, at least one beamforming matrix may be obtained from the feedback information and used to derive the at least one steering matrix. In any case, a third frame may be sent to the receiver with transmit spatial processing based on the at least one steering matrix (block 518).

FIG. 6 shows a design of an apparatus 600 for a transmitter/initiator. Apparatus 600 includes means for sending a first frame comprising training symbols (module 612), means for receiving a second frame comprising a first portion followed by a second portion, with the first portion having a length determined by the amount of time to generate feedback information by a receiver, and the second portion carrying the feedback information (module 614), means for deriving at least one steering matrix based on the feedback information obtained from the second frame (module 616), and means for sending a third frame with transmit spatial processing based on the at least one steering matrix (module 618).

Figures 7, 8:
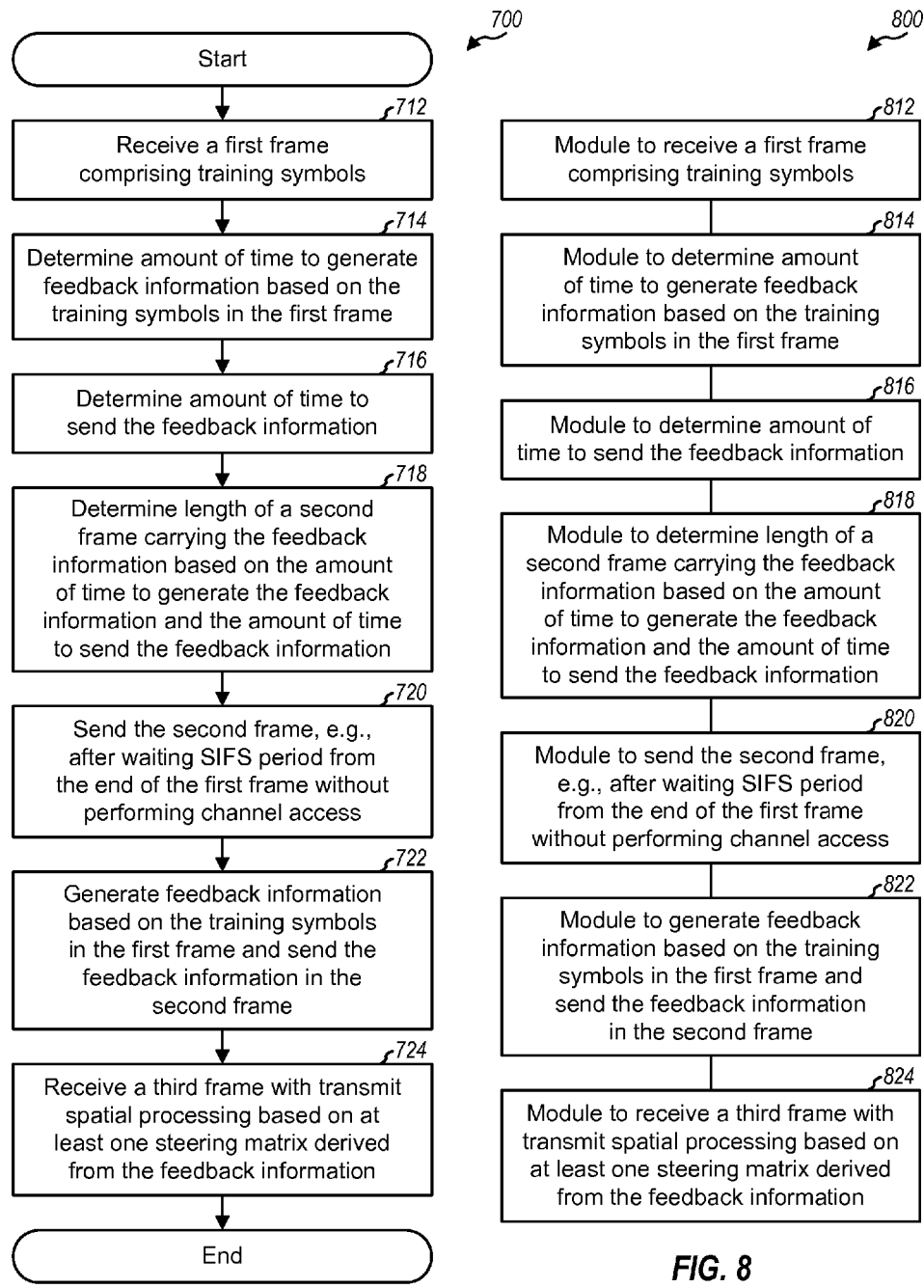
FIG. 7 shows a process performed by a receiver/responder.
FIG. 8 shows an apparatus for a receiver/responder.

FIG. 7 shows a design of a process 700 performed by a receiver/responder. A first frame comprising training symbols may be received from a transmitter/initiator (block 712). The amount of time to generate feedback information based on the training symbols in the first frame may be determined (block 714). The amount of time to send the feedback information may also be determined (block 716). The length of a second frame carrying the feedback information may be determined based on the amount of time to generate the feedback information and the amount of time to send the feedback information (block 718). The second frame may be sent to the transmitter after waiting SIFS period from the end of the first frame, without performing channel access (block 720). The feedback information may be generated based on the training symbols in the first frame and sent in the second frame (block 722). A third frame with transmit spatial processing based on at least one steering matrix derived from the feedback information may be received (block 724).

For blocks 714 and 716, the type of feedback information to generate may be identified from among multiple feedback information types. A data rate to use for the second frame may be determined, e.g., based on received signal quality ascertained from the training symbols in the first frame. The amount of time to generate the feedback information may be determined based on the type of feedback information to generate and/or other factors. The amount of time to send the feedback information may be determined based on the data rate for the second frame, the type of feedback information to send, and/or other factors.

The second frame may comprise a first portion followed by a second portion. The first portion may have a length equal to or exceeding the amount of time to generate the feedback information. The second portion may carry the feedback information. The second frame may carry an A-MPDU with a first set of at least one MPDU for the first portion followed by a second set of at least one MPDU for the second portion. The first set of at least one MPDU may have a length equal to or exceeding the amount of time to generate the feedback information. The second set of at least one MPDU may carry the feedback information.

For block 722, at least one channel matrix may be derived based on the training symbols in the first frame. The feedback information may be generated based on the at least one channel matrix and may comprise CSI. Alternatively, at least one beamforming matrix may be derived based on the at least one channel matrix. The feedback information may then be generated based on the at least one beamforming matrix and may comprise non-compressed or compressed beamforming matrices.

FIG. 8 shows a design of an apparatus 800 for a receiver/responder. Apparatus 800 includes means for receiving a first frame comprising training symbols (module 812), means for determining the amount of time to generate feedback information based on the training symbols in the first frame (module 814), means for determining the amount of time to send the feedback information (module 816), means for determining the length of a second frame carrying the feedback information based on the amount of time to generate the feedback information and the amount of time to send the feedback information (module 818), means for sending the second frame, e.g., after waiting SIFS period from the end of the first frame, without performing channel access (module 820), means for generating the feedback information based on the training symbols in the first frame and sending the feedback information in the second frame (module 822), and means for receiving a third frame with transmit spatial processing based on at least one steering matrix derived from the feedback information (module 824).

The modules in FIGS. 6 and 8 may comprise processors, electronics devices, hardware devices, electronics components, logical circuits, memories, etc., or any combination thereof.

Figure 9:
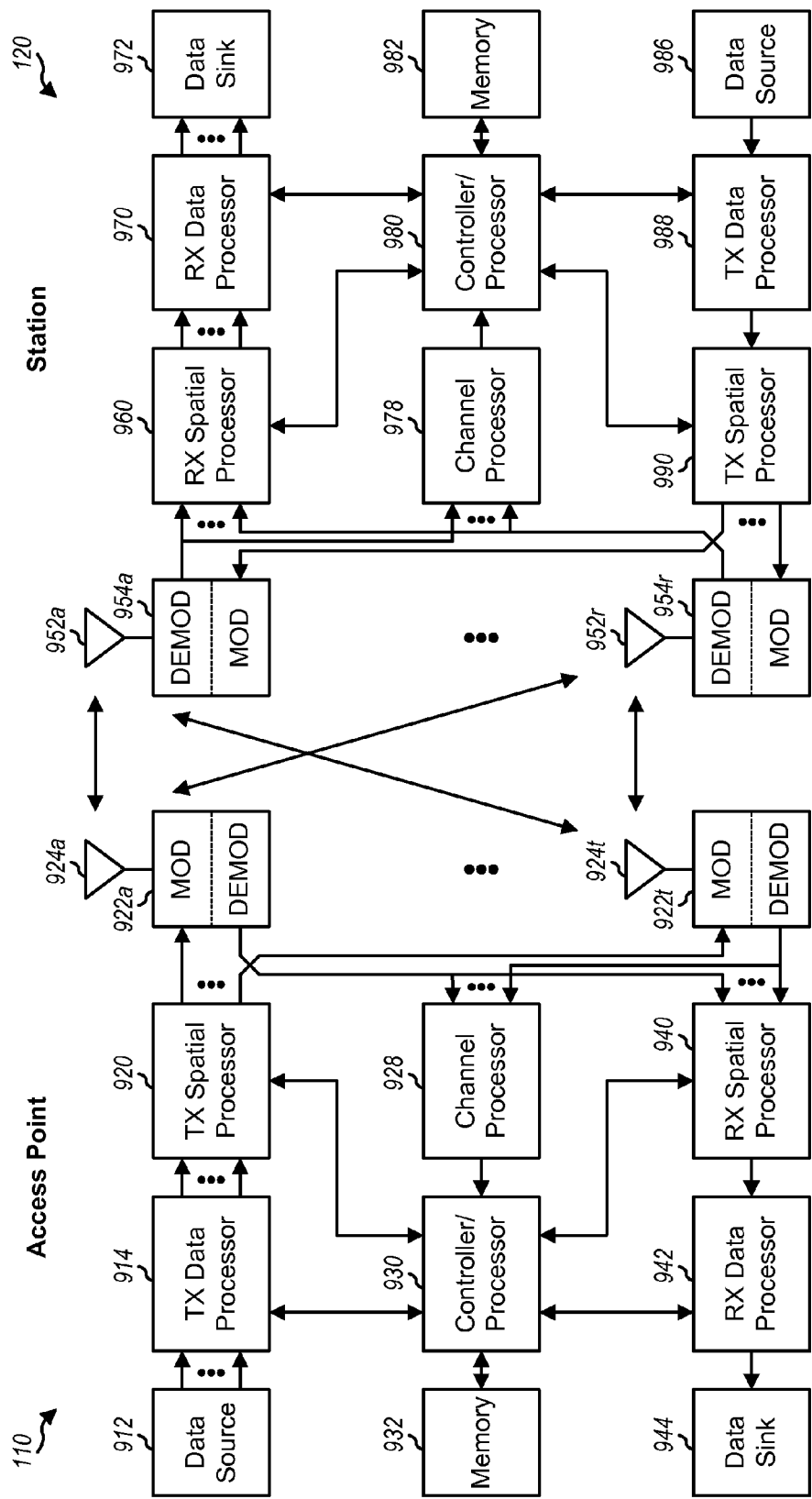
FIG. 9 shows a block diagram of an access point and one station.

FIG. 9 shows a block diagram of a design of access point 110 and one station 120 in FIG. 1. Access point 110 is equipped with multiple (T) antennas 924a through 924t that may be used for data transmission and reception. Station 120 is equipped with multiple (R) antennas 952a through 952r that may be used for data transmission and reception.

On the downlink, at access point 110, a transmit (TX) data processor 914 may receive traffic data from a data source 912 and/or other data from a controller/processor 930. TX data processor 914 may process (e.g., format, encode, interleave, and symbol map) the received data and generate data symbols, which are modulation symbols for data. A TX spatial processor 920 may multiplex the data symbols with training symbols, perform transmit spatial processing with downlink steering matrices, and provide T streams of output symbols to T modulators (MOD) 922a through 922t. Training symbols are also commonly referred to as pilot symbols. Each modulator 922 may process its output symbol stream (e.g., for OFDM) to generate an output chip stream. Each modulator 922 may further condition (e.g., convert to analog, amplify, filter, and upconvert) its output chip stream to generate a downlink signal. T downlink signals from modulators 922a through 922t may be transmitted from antennas 924a through 924t, respectively.

At station 120, R antennas 952a through 952r may receive the downlink signals from access point 110, and each antenna 952 may provide a received signal to a respective demodulator (DEMOD) 954. Each demodulator 954 may perform processing complementary to the processing performed by modulators 922 to obtain received symbols. A receive (RX) spatial processor 960 may perform spatial matched filtering on the received symbols from all demodulators 954a through 954r and provide data symbol estimates, which are estimates of the data symbols transmitted by access point 110. An RX data processor 970 may further process (e.g., symbol demap, deinterleave, and decode) the data symbol estimates and provide decoded data to a data sink 972 and/or a controller/processor 980.

A channel processor 978 may process training symbols received from access point 110 and may estimate the downlink MIMO channel response. Processor 978 may decompose a downlink channel matrix for each subcarrier or each group of subcarriers of interest, e.g., as shown in equation (2), to obtain a corresponding beamforming matrix. Processor 978 may generate feedback information for the channel matrices or the (non-compressed or compressed) beamforming matrices. Processor 978 may provide the feedback information to controller/processor 980 to send back to access point 110. Processor 978 may also derive a spatial filter matrix for each subcarrier or each group of subcarriers of interest based on the corresponding channel matrix and/or beamforming matrix. Processor 978 may provide the spatial filter matrices to RX spatial processor 960 for downlink spatial matched filtering.

The processing for the uplink may be the same as or different from the processing for the downlink. Traffic data from a data source 986 and/or other data (e.g., feedback information) from controller/processor 980 may be processed (e.g., encoded, interleaved, and modulated) by a TX data processor 988, and further multiplexed with training symbols and spatially processed by TX spatial processor 990 with uplink steering matrices. The output symbols from TX spatial processor 990 may be further processed by modulators 954a through 954r to generate R uplink signals, which may be transmitted via antennas 952a through 952r.

At access point 110, the uplink signals from station 120 may be received by antennas 924a through 924t and processed by demodulators 922a through 922t to obtain received symbols. An RX spatial processor 940 may perform spatial matched filtering on the received symbols and provide data symbol estimates. An RX data processor 942 may further process the data symbol estimates, provide decoded data to a data sink 944, and provide the feedback information to controller/processor 930. Processor 930 may derive downlink steering matrices for station 120 based on the feedback information. The feedback information may be stored in a memory (e.g., memory 932) that may be accessible to both MAC and PHY for efficient processing, as described above.

A channel processor 928 may process training symbols received from station 120 and may estimate the uplink MIMO channel response. Processor 928 may decompose an uplink channel matrix for each subcarrier or each group of subcarriers of interest to obtain a corresponding beamforming matrix. Processor 928 may also derive a spatial filter matrix for each subcarrier or each group of subcarriers of interest. Processor 928 may provide the spatial filter matrices to RX spatial processor 940 for uplink spatial matched filtering and may provide the channel matrices or beamforming matrices to controller/processor 930 for feedback to station 120.

Controllers/processors 930 and 980 may control the operation at access point 110 and station 120, respectively. Memories 932 and 982 may store data and program codes for access point 110 and station 120, respectively. Processors 928, 930, 978, 980 and/or other processors may perform the processes and functions described herein, e.g., process 500 in FIG. 5, process 700 in FIG. 7, etc.

The techniques described herein may be implemented by various means. For example, these techniques may be implemented in hardware, firmware, software, or a combination thereof. For a hardware implementation, the processing units used to perform the techniques at a given entity (e.g., a transmitter or a receiver) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 932 or 982 in FIG. 9) and executed by a processor (e.g., processor 930 or 980). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
 a processor configured to receive a first frame comprising training symbols, to determine an amount of time to generate feedback information based on the training symbols in the first frame, and to generate a second frame, the second frame having a length determined prior to generating the feedback information based at least on the determined amount of time to generate the feedback information and the second frame having a second portion, the first portion having a length equal to or exceeding the amount of time to generate the feedback information, the second portion carrying the feedback information; and
 a memory coupled to the processor.

2. The apparatus of claim 1, wherein the processor is configured to identify a type of feedback information to generate from among multiple feedback information types, and to determine the amount of time to generate the feedback information based on the type of feedback information to generate.

3. The apparatus of claim 1, wherein the processor is configured to determine an amount of time to send the feedback information and to determine the length of the second frame based further on the amount of time to send the feedback information.

4. The apparatus of claim 3, wherein the processor is configured to determine a data rate for the second frame, to identify type of feedback information to send from among multiple feedback information types, and to determine the amount of time to send the feedback information based on the data rate and the type of feedback information to send.

5. The apparatus of claim 1, wherein the processor is configured to form an aggregate Medium Access Control (MAC) protocol data unit (A-MPDU) comprising multiple MPDUs, and to generate the second frame with the A-MPDD.

6. The apparatus of claim 5, wherein the processor is configured to form the A-MPDU with a first set of at least one MPDU followed by a second set of at least one MPDU, the first set of at least one MPDU having a length equal to or exceeding the amount of time to generate the feedback information, and to provide the feedback information in the second set of at least one MPDD.

7. The apparatus of claim 5, wherein the processor is configured to form a first MPDU having a length equal to or exceeding the amount of time to generate the feedback information, to form a second MPDU with the feedback information, and to form the A-MPDU with the first MPDU followed by the second MPDD.

8. The apparatus of claim 1, wherein the processor is configured to wait a short interframe space (SIFS) period after the end of the first frame and to send the second frame after waiting the SIFS period and without performing channel access.

9. The apparatus of claim 1, wherein the processor is configured to derive at least one channel matrix based on the training symbols in the first frame, and to generate the feedback information based on the at least one channel matrix.

10. The apparatus of claim 1, wherein the processor is configured to derive at least one channel matrix based on the training symbols in the first frame, to derive at least one beamforming matrix based on the at least one channel matrix, and to generate the feedback information based on the at least one beamforming matrix.

11. The apparatus of claim 1, wherein the feedback information comprises at least one compressed beamforming matrix.

12. The apparatus of claim 1, wherein the feedback information comprises channel state information (CSI).

13. The apparatus of claim 1, wherein the processor is configured to set a length field of the second frame to the length of the second frame.

14. A method comprising:
 receiving a first frame comprising training symbols;
 determining an amount of time to generate feedback information based on the training symbols in the first frame; and
 sending a second frame for the feedback information, the second frame having a length determined prior to generating the feedback information based at least on the amount of time to generate the feedback information and the second frame having a second portion, the first portion having a length equal to or exceeding the amount of time to generate the feedback information, the second portion carrying the feedback information.

15. The method of claim 14, further comprising:
 determining amount of time to send the feedback information; and
 determining the length of the second frame based further on the amount of time to send the feedback information.

16. The method of claim 14, further comprising:
 generating the second frame with a first portion followed by a second portion, the first portion having a length equal to or exceeding the amount of time to generate the feedback information, the second portion carrying the feedback information.

17. The method of claim 14, wherein the sending the second frame comprises waiting a short interframe space (SIFS) period after the end of the first frame, and
sending the second frame after waiting the SIFS period and without performing channel access.

18. An apparatus comprising:
means for receiving a first frame comprising training symbols;
means for determining an amount of time to generate feedback information based on the training symbols in the first frame; and
means for sending a second frame for the feedback information, the second frame having a length determined prior to generating the feedback information based at least on the amount of time to generate the feedback information and the second frame having a second portion, the first portion having a length equal to or exceeding the amount of time to generate the feedback information, the second portion carrying the feedback information.

19. The apparatus of claim 18, further comprising:
means for determining amount of time to send the feedback information; and
means for determining the length of the second frame based further on the amount of time to send the feedback information.

20. The apparatus of claim 18, further comprising:
means for generating the second frame with a first portion followed by a second portion, the first portion having a length equal to or exceeding the amount of time to generate the feedback information, the second portion carrying the feedback information.

21. The apparatus of claim 18, wherein the means for sending the second frame comprises
means for waiting a short interframe space (SIFS) period after the end of the first frame, and
means for sending the second frame after waiting the SIFS period and without performing channel access.

22. A computer-program product for regulating the receipt of data transmitted from a messaging device, the computer-program product comprising:
a processor-readable storage device including instructions stored thereon, the instructions comprising:
first instructions for receiving a first frame comprising training symbols;
second instructions for determining an amount of time to generate feedback information based on the training symbols in the first frame; and
third instructions for sending a second frame for the feedback information, the second frame having a length determined prior to generating the feedback information based at least on the amount of time to generate the feedback information and the second frame having a second portion, the first portion having a length equal to or exceeding the amount of time to generate the feedback information, the second portion carrying the feedback information.

23. The computer-program product of claim 22, wherein the instructions further comprise:
fourth instructions for determining amount of time to send the feedback information; and
fifth instructions for determining the length of the second frame based further on the amount of time to send the feedback information.

24. The computer-program product of claim 22, wherein the instructions further comprise:
fourth instructions for generating the second frame with a first portion followed by a second portion, the first portion having a length equal to or exceeding the amount of time to generate the feedback information, the second portion carrying the feedback information.

25. An apparatus comprising:
a processor configured to send a first frame comprising training symbols, to receive a second frame comprising a first portion followed by a second portion, the first portion having a length determined prior to a generation of feedback information at a receiver of the first frame based on a predetermined amount of time associated with generating the feedback information by the receiver of the first frame, the second frame having a second portion, the first portion having a length equal to or exceeding the amount of time to generate the feedback information, the second portion carrying the feedback information; to derive at least one steering matrix based on the feedback information obtained from the second frame; and
a memory coupled to the processor.

26. The apparatus of claim 25, wherein the processor is configured to receive from the second frame an aggregate Medium Access Control (MAC) protocol data unit (A-MPDU) comprising a first MPDU for the first portion and a second MPDU for the second portion.

27. The apparatus of claim 25, wherein the processor is configured to obtain at least one channel matrix from the feedback information, to derive at least one beamforming matrix based on the at least one channel matrix, and to derive the at least one steering matrix based on the at least one beamforming matrix.

28. The apparatus of claim 25, wherein the processor is configured to obtain at least one beamforming matrix from the feedback information, and to derive the at least one steering matrix based on the at least one beamforming matrix.

29. The apparatus of claim 25, wherein the processor is configured to receive the second frame after a short interframe space (SIFS) period from the end of the first frame.

30. The apparatus of claim 25, wherein the processor is configured to perform transmit spatial processing for a third frame based on the at least one steering matrix, and to send the third frame to the receiver.

31. A method comprising:
sending a first frame comprising training symbols;
receiving a second frame comprising a first portion followed by a second portion, the first portion having a length determined prior to a generation of feedback information at a receiver of the first flame based on a predetermined amount of time associated with generating the feedback information by the receiver of the first frame, the first portion having a length equal to or exceeding the amount of time to generate the feedback information, the second portion carrying the feedback information; and
deriving at least one steering matrix based on the feedback information obtained from the second frame.

32. The method of claim 31, wherein the deriving the at least one steering matrix comprises
obtaining at least one channel matrix from the feedback information,
deriving at least one beamforming matrix based on the at least one channel matrix, and
deriving the at least one steering matrix based on the at least one beamforming matrix.

33. The method of claim 31, wherein the deriving the at least one steering matrix comprises obtaining at least one beamforming matrix from the feedback information, and deriving the at least one steering matrix based on the at least one beamforming matrix.

34. An apparatus comprising:

means for sending a first frame comprising training symbols; means for receiving a second frame comprising a first portion followed by a second portion, the first portion having a length determined prior to a generation of feedback information at a receiver of the first frame based on a predetermined amount of time associated with generating the feedback information by the receiver of the first frame, the first portion having a length equal to or exceeding the amount of time to generate the feedback information, the second portion carrying the feedback information; and means for deriving at least one steering matrix based on the feedback information obtained from the second frame.

35. The apparatus of claim 34, wherein the means for deriving the at least one steering matrix comprises means for obtaining at least one channel matrix from the feedback information, means for deriving at least one beamforming matrix based on the at least one channel matrix, and means for deriving the at least one steering matrix based on the at least one beamforming matrix.

36. The apparatus of claim 34, wherein the means for deriving the at least one steering matrix comprises means for obtaining at least one beamforming matrix from the feedback information, and means for deriving the at least one steering matrix based on the at least one beamforming matrix.

37. A computer-program product for regulating the receipt of data transmitted from a messaging device, the computer-program product comprising:

a processor-readable storage device including instructions stored thereon, the instructions comprising:

first instructions for sending a first frame comprising training symbols;

second instructions for receiving a second frame comprising a first portion followed by a second portion, the first portion having a length determined prior to a generation of feedback information at a receiver of the first frame by an amount of time to generate the feedback information by the receiver of the first frame, the first portion having a length equal to or exceeding the amount of time to generate the feedback information, the second portion carrying the feedback information; and third instructions for deriving at least one steering matrix based on the feedback information obtained from the second frame.

38. An apparatus comprising:

a processor configured to receive a first frame requesting for feedback information for beamforming, to select one of multiple types of preamble based on a determined amount of time to generate the feedback information for the first frame, and to send a second frame with a preamble of the selected type and including the feedback information, the second frame having a length determined prior to generating the feedback information based at least on the determined amount of time to generate the feedback information and the second frame having a second portion, the first portion having a length equal to or exceeding the amount of time to generate the feedback information, the second portion carrying the feedback information; and a memory coupled to the processor.

39. The apparatus of claim 38, wherein the processor is configured to determine a frame type of the first frame based on a preamble for the first frame, and to select the preamble type for the second frame based on the frame type of the first frame.

40. The apparatus of claim 38, wherein the processor is configured to determine the amount of time to generate feedback information based on training symbols in the first frame.

41. The apparatus of claim 38, wherein the processor is configured to select a mixed-mode preamble or a greenfield preamble for the second frame.

* * * * *